Nov. 9, 1965 L. B. SCOTT 3,217,249
LINEARITY TESTER HAVING A HIGHLY LINEAR CORRELATION
BETWEEN SHAFT ROTATION AND OUTPUT VOLTAGE
Filed April 27, 1961 9 Sheets-Sheet 3

INVENTOR.
Larkin B. Scott
BY
ATTORNEY.

Nov. 9, 1965 L. B. SCOTT 3,217,249
LINEARITY TESTER HAVING A HIGHLY LINEAR CORRELATION
BETWEEN SHAFT ROTATION AND OUTPUT VOLTAGE
Filed April 27, 1961 9 Sheets-Sheet 4

INVENTOR.
*Larkin B. Scott*
BY
*ATTORNEY.*

Nov. 9, 1965  L. B. SCOTT  3,217,249
LINEARITY TESTER HAVING A HIGHLY LINEAR CORRELATION
BETWEEN SHAFT ROTATION AND OUTPUT VOLTAGE
Filed April 27, 1961  9 Sheets-Sheet 7

INVENTOR.
Larkin B. Scott
BY
Gerald E. Bramblett Jr.
ATTORNEY.

Nov. 9, 1965

L. B. SCOTT 3,217,249

LINEARITY TESTER HAVING A HIGHLY LINEAR CORRELATION
BETWEEN SHAFT ROTATION AND OUTPUT VOLTAGE

Filed April 27, 1961

INVENTOR.
Larkin B. Scott
BY
*Harold E. Bramblett*
ATTORNEY.

United States Patent Office 3,217,249
Patented Nov. 9, 1965

3,217,249
LINEARITY TESTER HAVING A HIGHLY LINEAR CORRELATION BETWEEN SHAFT ROTATION AND OUTPUT VOLTAGE
Larkin B. Scott, Fort Worth, Tex., assignor to The Perkin-Elmer Corporation, Norwalk, Conn., a corporation of New York
Filed Apr. 27, 1961, Ser. No. 105,927
15 Claims. (Cl. 324—63)

This invention relates to electrical linearity testing apparatus and, more particularly, to apparatus capable of generating a highly linear curve of output potential V shaft rotation.

Apparatus adapted to provide electrical outputs proportional to shaft rotation are well-known in the art. Examples of such apparatus are disclosed in my U.S. Patent 2,843,822 issued July 15, 1958, and in my copending patent application Serial No. 847,958 filed October 22, 1959, now Patent No. 3,129,382 and entitled, "Precision Transducer." As the requirements of the control circuits required by both industry and the military become more and more rigid, it becomes increasingly important to test thoroughly each component before it is incorporated into a final assembly. As the components themselves become more accurate, proper testing becomes more difficult. For example, one of the commercially available A.C. potentiometers produced in accordance with the teachings of the above-mentioned patent is designed to produce a 400 c.p.s. output varying from 0 to 35 volts through a total shaft rotation of 30 turns (10,800°). This particular model potentiometer has a linearity of ±0.01%. The linearities of other models vary between ±0.02% and ±0.05%.

It will be obvious immediately that the confirmation of such extreme accuracies is a very difficult matter. A number of expedients have been employed in the past to achieve this result. For example, slide wires having movable taps have been employed to balance the voltage output. However, the accuracy of such devices is highly susceptible to errors introduced by slight variations in the size of the wire along its length and by the existence of minute imperfections in the wire. Furthermore, variations in contact pressure between wire and tap, and the existence of dirt, dust, oxidation films, etc., cause undesirable noise.

Another approach has been to select periodically the most linear of the manufactured devices and use it as a standard. This is a "cut and try" method with its obvious disadvantages including lack of any specific and permanent standard for continuous quality control. Another disadvantage of this method is that a separate "standard" may be required for each model manufactured.

It is, accordingly, the primary object of the present invention to provide an electrical voltage source having a highly linear correlation between shaft rotation and output voltage.

Another object of the invention is to provide such a source which is substantially free of assymetrical errors.

Another object of this invention is to provide such a source relatively free of noise due to variations in contact resistance between the slide wire and the individual sliding taps.

Another object of this invention is to provide such a source which is essentially free of voltage drop errors due to current flow in either the apparatus itself or the device under test.

Another object of this invention is to provide such a source which is easily adjustable to test devices of differing electrical and mechanical characteristics.

Another object of this invention is to provide a tester having a continuously available standardizing function.

The manner in which the above objects are achieved will be apparent from the following description, the appended claims, and the figures of the attached drawings wherein:

*Principle of operation*

Figures 1, 2:
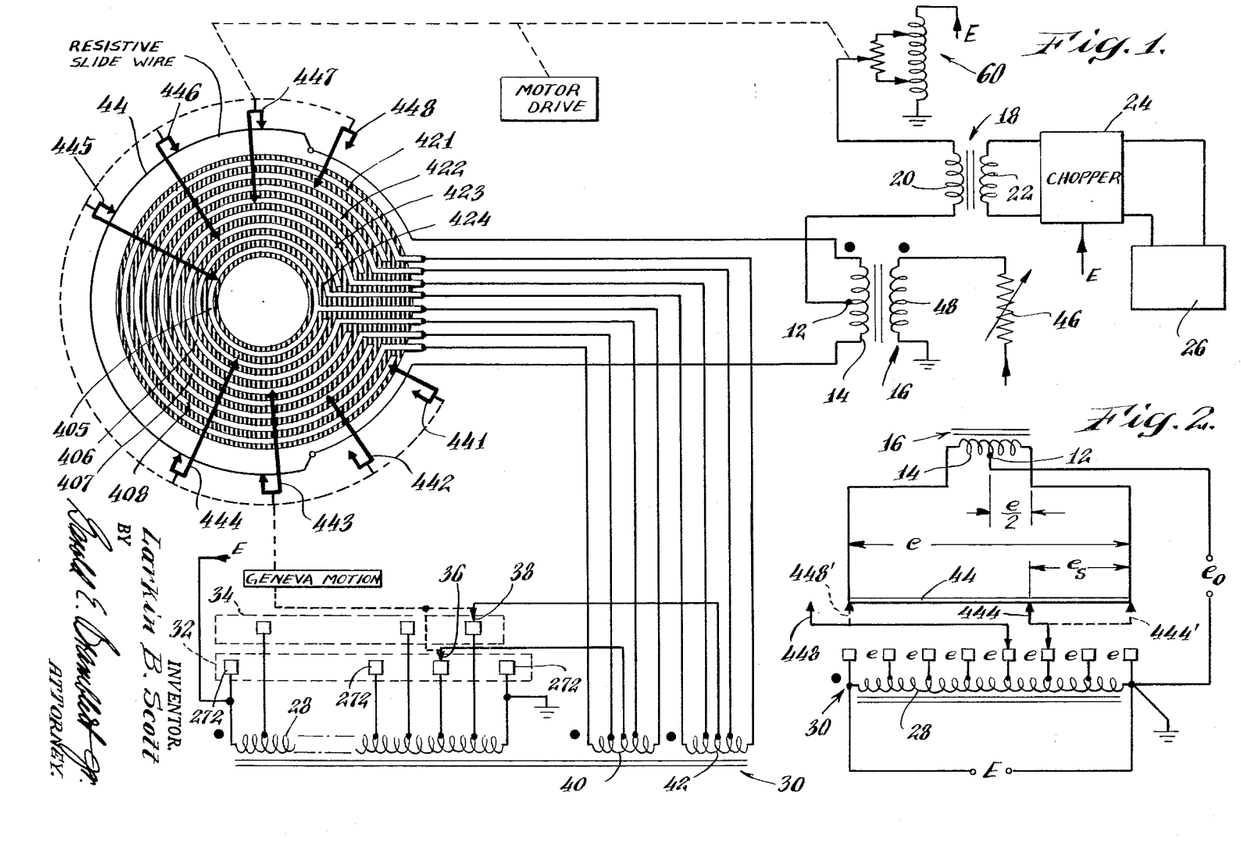
FIG. 1 is a schematic diagram of the electrical systems of the tester of the invention and of the device under test.
FIG. 2 is a simplified version of the circuit of the tester used in explaining the theory of operation.

The manner in which the apparatus of this invention operates will be more apparent by specific reference to FIG. 1 of the drawing.

The device 60 to be tested is mechanically coupled to the spindle of the tester so as to rotate in synchronism with it. The tester develops an output voltage which is a highly accurate linear function of the spindle rotation. This output appears at the center tap 12 of the secondary winding 14 on transformer 16. The error is recorded by the well know method of connecting the primary of a transformer 18 between the output of the tester and the output of the unit under test. A voltage is induced across its secondary 22 proportional to the difference between these two output voltages. This difference voltage is applied to a chopper 24 operating as a phase sensitive detector so as to create a D.C. error voltage which may then be recorded by a standard type of strip chart recorder 26.

Both the tester and the device 60 under test are operated as voltage dividers and connected to a common voltage source E in the manner that is referred to as a "bridge" circuit. For this reason, line voltage variations do not materially affect the test function except to the extent that a given percentage change in the magnitude of line voltage will make an equal percentage change in the magnitude of the error being recorded. Since knowledge of the absolute value of the error is only required to within a few percent, the effect of normal variations in line voltage is tolerated.

The basic voltage division within the tester is accomplished by a winding 28 on transformer 30 acting as an auto-transformer. This winding possesses 61 taps which are connected to the segments of two commutators, even numbered taps to one commutator 32 and odd numbered to the other commutator 34. The wipers 36, 38, which engage these commutator segments are driven mechanically by a Geneva type of mechanism which is part of the tester spindle. Each wiper advances the distance from one commutator segment to the next for each revolution of the spindle. Furthermore, the arrangement is such that the advancement of one commutator wiper occurs at a point of spindle rotation that is approximately 180° away from that at which advancement of the other wiper occurs. The two wipers thus advance along the taps of transformer 30 in "hand over hand" sequence.

There are two additional windings 40, 42 on transformer 30 and each is connected electrically by means of a centertap to one of the commutator wipers 36, 38. Each of windings 40, 42 possesses 4 taps each of which is connected to one of eight concentric slip rings 405–408, 421–424. Concentric about the eight slip rings and encompassing an arc slightly greater than 180° there is a resistive slide wire 44. There are eight slide wire wipers 441–448 having fixed angular separation with respect to one another and mechanically supported by the spindle of the tester. On rotation of the spindle, these wipers move along the slide wire 44. Each of these wipers also is in electrical contact with a slip ring so as to complete several electrical connections between slide wire 44 and windings 40, 42 of transformer 30.

There is a voltage gradient along slide wire 44 caused by current flowing from transformer 16. An adjustable trimming resistor 46 in series with the primary winding 48 of transformer 16 provides for adjustment of the current through slide wire 44 and enables the magnitude of the voltage gradient along the slide wire to be varied over a small range. In the condition of correct adjustment, the voltage difference between any two points on the slide wire exactly 180° apart is just equal to the voltage difference between two adjacent taps on the auto-transformer winding 28.

The operation of the tester may be best explained by considering only two slide wire wipers. These wipers would be separated from one another by exactly 180°. As an example, consider the slide wire wipers 443 and 447. By contacting slip ring 423, wiper 443 is tied electrically to secondary winding 42 of transformer 30. The other wiper, 447, is similarly connected through slip ring 407 to secondary 40. These secondaries are in turn connected to taps on the auto-transformer winding 28 as explained previously. (Actually the secondary windings 40, 42 would serve no purpose if only two slide wire wipers were to be used since the slide wire wipers 443, 447 could be tied directly to the commutator wipers 36, 38. The purpose of these secondary windings 40, 42 will become more evident at a later point in this description.) With two slide wire wipers 443, 447 180° apart, and with slide wire 44 occupying the arc of a circle something in excess of 180°, it follows that for any spindle position either one or the other (and sometimes both) of the slide wire wipers 443, 447 is in contact with slide wire 44. Thus the entire slide wire circuit is always connected electrically back to some tap on winding 28 of the auto-transformer 30. Even when both slide wire wipers 443, 447 are in contact with slide wire 44 (at which time the slide wire electrically spans two adjacent taps of windings 28) no current is drawn from transformer 30 since an equal and opposite voltage is delivered by transformer 16. The voltage (with respect to the grounded side of the excitation) that appears at the center tap 12 of the secondary 14 of transformer 16 thus depends on which tap of winding 28 is connected to slide wire 44 and also on the voltage difference between center tap 12 and the point at which a wiper contacts slide wire 44. Since the latter varies as the spindle is rotated, and assuming that the voltage gradient along slide wire 44 is perfectly linear, this output voltage (at center tap 12) becomes a linear function of spindle rotation. The slide wire 44 thus serves to give a smooth interpolation from the voltage level of one tap on winding 28 to the next. The switching of a slide wire wiper 36 or 38 from the voltage of one tap to the next is synchronised with spindle rotation so as to take place only at the time that wiper is out of contact with the slide wire.

In order to better understand the theory of operation of the tester of this invention, a simplified schematic diagram is illustrated in FIG. 2. In this embodiment, slide wire 44 is illustrated as straightened rather than curved. Also, the device is shown merely as a transducer without the tested apparatus or means for producing the error signal. As pointed out above, the theory of operation may be understood by considering the number of wipers as reduced to two and by eliminating windings 40 and 42 and tying the wipers directly to the taps of winding 28. In the illustration of FIG. 2:

(1) $$e_o = (e_{444}) - e_s + \frac{e}{2}$$

When both wipers are on slide wire 44 as indicated by 444′ and 448′, $e_s = 0$. With $e_{444} = 2e$:

(2) $$e_o = 2e + \frac{e}{2} = \frac{5}{2}e$$

As wiper 444 moves toward the illustrated position, $e_s$ increased to some value less than $e$ so that $e_0$ decreases. When wiper 444 reaches the left end of slide wire 44, $e_s = e$ so that:

(3) $$e_o = 2e - e + \frac{e}{2} = \frac{3}{2}e$$

During this period, wiper 448 has "switched" to the second tap from the right on winding 28 and contacts the right end of wire 44. Wiper 444 leaves the left end of wire 44 and, while returning to the right end of wire 44, switches "back" by two commutator segments. This "hand over hand" movement continues to the extreme right end of winding 28.

There are two reasons for using more than two slide wire wipers. First, it is desirable to provide multiple points of contacts for a wiper on a resistive voltage divider in order to combat the problem of "noise" which arises due to contact resistance or actual opens due to bounce or dirty surface conditions. The probability of several sets of contacts functioning improperly at the same time is small.

The second reason for using multiple slide wire wipers is that it provides an improvement in the linearity of the tester. Although every practical means may be used to achieve a perfectly linear voltage gradient along the slide wire, errors due to eccentricity, run-out effects, and slide wire imperfections are the limiting factors in achieving perfect linearity. The errors due to these sources are not limiting until other factors can be controlled to something better than .001%. Consequently, this problem has not arisen in prior art devices incapable of achieving such accuracy. By using the multiple wiper configuration, and by spreading the opposing wiper pairs as much as possible in their angular separation, the errors due to non-linear voltage gradient or eccentricity are different for each wiper pair. Since there cannot be four different output voltages, the output voltage for any given spindle position is an average value determined by the four wiper pairs. For this reason, the wipers are separated as much as possible, the limitation being that their separation must represent an integral number of turns on the secondary (40 or 42) of transformer 30, and cannot be so great as to reduce the interval for switching the commutator wipers 36, 38 to an impractically small angle.

To achieve the highest possible resolution, solid wire should be used for the slide wire, rather than a winding. Because of the resistivity of available materials, the solid wire 44 cannot be made as large in diameter as might be desired. Resistance would be too low—power consumption too high. This makes it difficult in practice to use a multi-fingered wiper design. To achieve the effect of multiple wipers, it becomes necessary to displace one wiper with respect to the other along the arc of slide wire 44. The voltage level of each wiper must then be slightly different from that of the adjoining wiper. This is achieved by connecting the wipers to each other through portions of the secondary windings 40, 42 of transformer 30 to provide the correct voltage separation. Any opposing pair of slide wire wipers (such as 441 and 445, or 442 and 446, etc.) would provide proper operation of the tester. There are then four such pairs operating in parallel.

*Mounting the unit under test*

Figure 3:
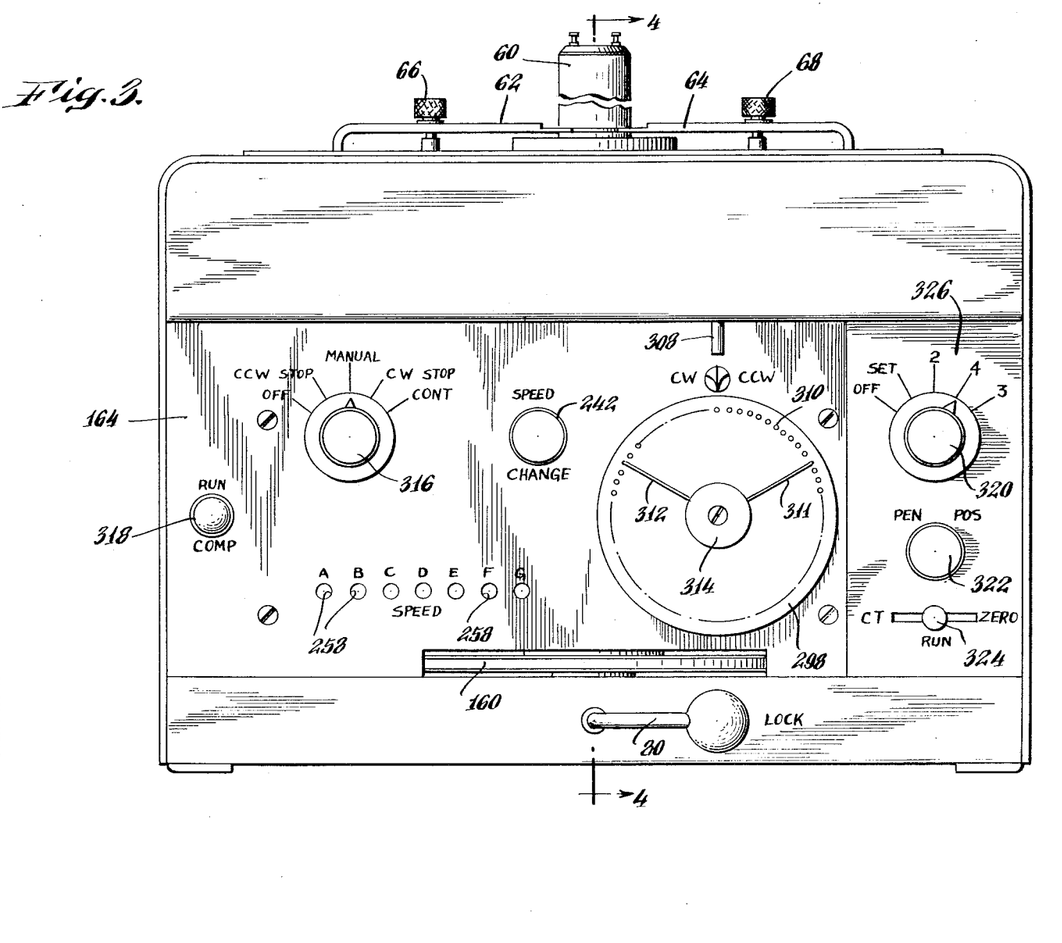
FIG. 3 is a front view of a tester constructed in accordance with the invention.

FIG. 3 illustrates a tester constructed in accordance with this invention having an A.C. transducer 60 of the type disclosed in my copending application Serial No. 847,958, filed October 22, 1959, in position for test. The unit under test is held down by two clamps 62, 64 secured by thumb screws 66, 68 extending through a slot 70 (FIG. 10) in each clamp. Its shaft 72 (FIG. 4) is gripped by a collet having three jaws 74, 76, 78 and located in the spindle of the tester. The collet is locked or released by actuating a lever 80 at the lower center of the front panel. As will be seen by reference to FIG. 4, lever 80 is positioned for rotation in a bearing 82 and in a bracket 84. A cylindrical cam 86 is fastened to the shaft of lever 80 by a pin 88. An actuating rod 90, terminating at its lower end in a cam rider 92, is slidably positioned within rotating spindle 94. The upper end of rod 90 carries a threaded member 96 which also slides within spindle 94 and may abut against block 98. Block 98 is secured to spindle 94 by a screw 100 so as to rotate therewith. An alignment pin 102, secured to member 96, slides within a bore 104 within block 98. Consequently, it will be apparent that pin 102 prevents any relative rotation between spindle 94 and member 96. Member 96 has, at its upper end, a threaded neck 106 which screws into the cylindrical base 110 of collet 108. Collet 108 is shown in detail in FIG. 16. Spring 116 exerts downward pressure on collet 108 and its strength determines the shaft gripping force of collet jaws 74, 76, and 78. The gripping force is independent of operator action and, in a specific embodiment, is sufficiently large to prevent slippage up to approximately one foot pound of torque.

Figures 10, 11, 12:
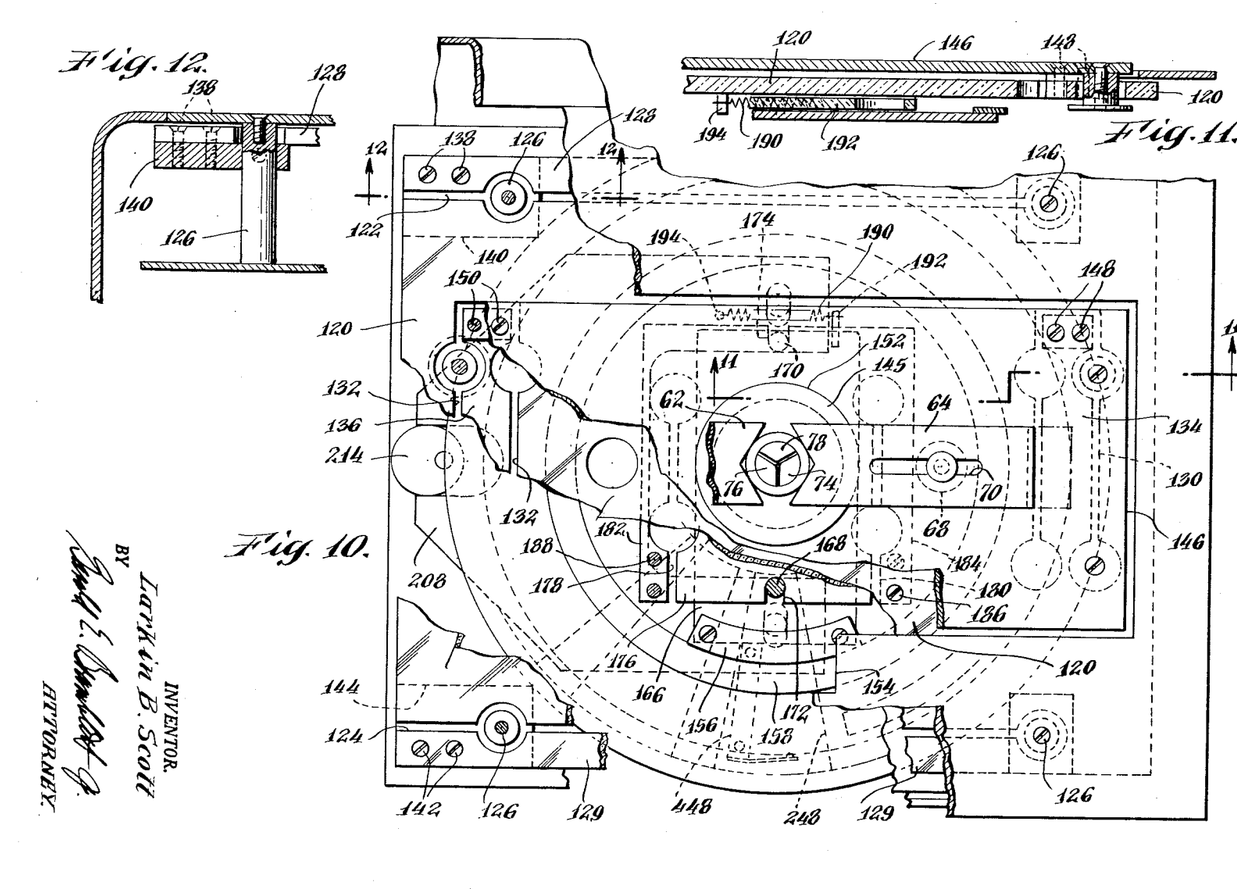
FIG. 10 is a top view of the apparatus of the invention, various portions being broken away to show constructional details.
FIG. 11 is a detailed elevation taken along the line 11—11 of FIG. 10.
FIG. 12 is a detail of the top plate mounting taken along line 12—12 of FIG. 10.

In a highly accurate device of this type, it is exceedingly important that suitable compensation be provided for minute eccentricity errors in the tester, in the device tested, and in the alignment between the two. Such compensation is provided in the apparatus of the invention by a novel mounting plate arrangement which will be explained by reference to FIGS. 4, 10, 11, and 12. Main mounting plate 120 may be formed of any suitably resilient material. In the described embodiment, a sheet of clear, ¼" Plexiglas plastic is employed. Plate 120 is pierced by two cuts 122, 124 parallel to each other and to the longitudinal axis of the plate. Each of these cuts includes two substantially circular openings which provide clearance for vertical posts 126. Cuts 122 and 124 are made near the long edges of sheet 120 so as to leave along each edge a strip 128, 129 which is transversely flexible. Enough material is removed from each cut to allow for the necessary movement. Two other cuts 130, 132 are also made in plate 120. These cuts are each substantially U-shaped with the long arms of the Us perpendicular to cuts 122, 124. Each U-shaped cut defines a corresponding tongue 134, 136. Two pairs of circular holes are included in each of cuts 130, 132. These holes serve two purposes: First, they supply room for mounting posts and screws to extend from below to above plate 120. Secondly, being positioned in opposing pairs, as shown in FIG. 10, they provide each of tongues 134, 136 with a narrowed section at either end for flexibility at these points.

Figures 4, 16:
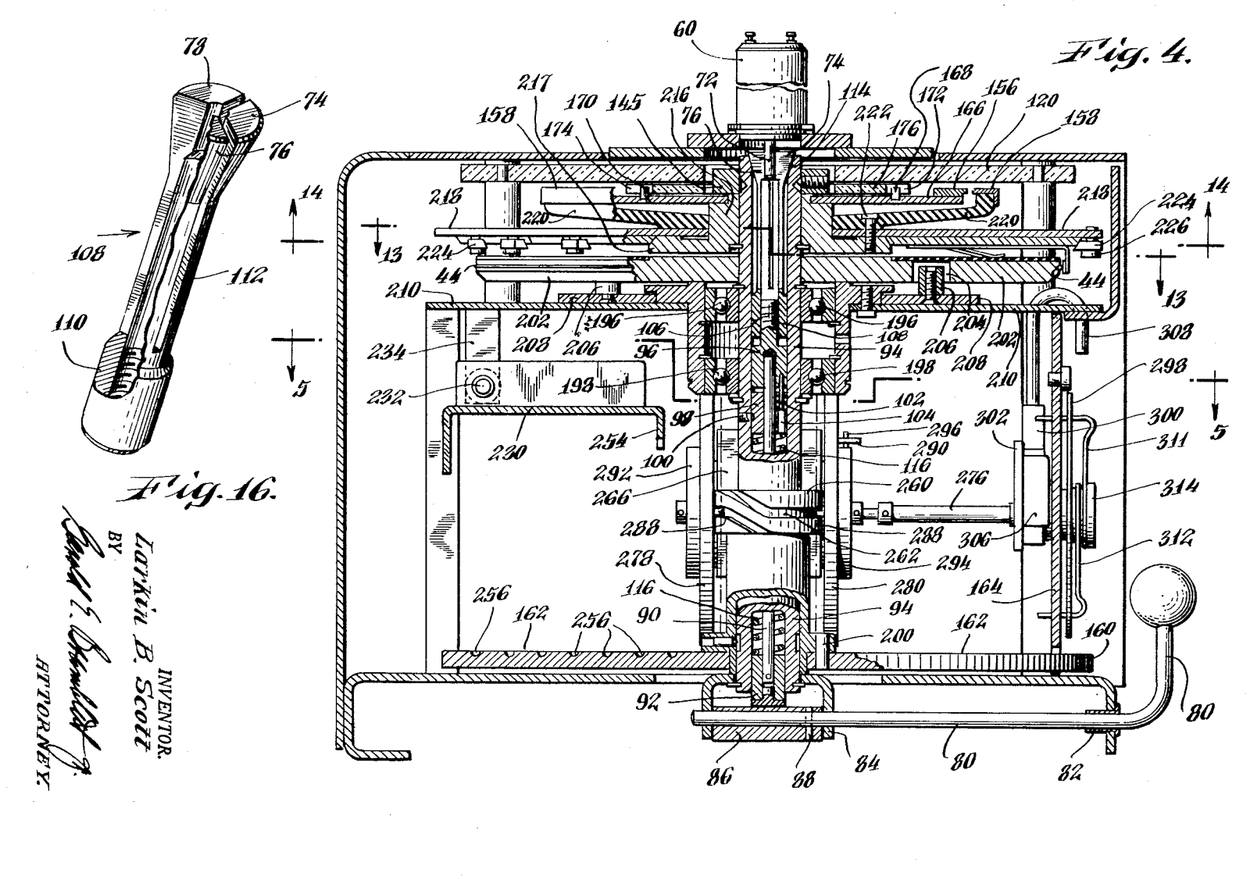
FIG. 4 is a cross-sectional elevation of the device of FIG. 3 taken along the line 4—4.
FIG. 16 is a view of a collet usable in the present invention.

Plate 120 is mounted on the tester by means of two screws 138 extending through strip 128 into mounting block 140 and two screws 142 extending through strip 129 into mounting block 144. The ends of strips 128 and 129 are thus retained in a fixed position so that plate 120 is free to move only in a transverse direction relative to the strips, the strips remaining parallel to one another. Plate 120 contains a central hole which fits over a collar 145 fastened to shaft 94 (FIG. 4).

A mounting plate 146 of a suitable material, such as aluminum, is fastened by means of screws 148, 150 to tongues 134 and 136. A central hole 152 is provided around collet jaws 74, 76, 78 and aligned with a similar hole in plate 120. Mounting plate 146 is drilled to receive the thumb screws 66, 68 of clamps 62, 64 previously described.

It will now be apparent that mounting plate 146 is constrained by screws 148, 150 and by tongues 134, 136 to movement along the longitudinal axis of the tester and by screws 138, 142 and strips 128 and 129 to movement transverse to that axis. Rotational movements about these axes are also allowed. Most importantly, the movement of plate 146 is completely free of rotation about the axis of spindle 94.

An accurate angle scale 158 reading 0–360° (both directions) may be viewed through a small window 154 on top of the instrument and is readable to one minute of arc with the aid of the vernier type index 156. The angle scale 158 provides a measurement of the angular position of main spindle 94. Direct manual adjustment of spindle position is simplified by access to the knurled edge 160 of the spindle drive disc 162 which protrudes slightly at the lower part of the front panel 164 (FIG. 3).

The vernier index 156 is mounted on the short edge of a rectangular index plate 166. Index plate 166 contains a central hole and is positioned to rotate against a shoulder on a collar 216 (FIG. 4). The central hole is designed to be self centering, somewhat in the fashion of a "V-block." This is accomplished by providing a hole of a size sufficient to fit the shaft, then removing material from the circumference to leave two bearing surfaces. Radial lines from the center of the shaft to each bearing surface form a V. Additionally, plate 166 is provided with two alignment studs 168 and 170 extending upward into slots 172 and 174 of index alignment member 176. Member 176 is formed from a sheet of Plexiglas in a manner similar to mounting plate 120. Thus, member 176 is provided with two longitudinal slots 178, 180 which leave spring-like side elements 182, 184. These side elements are positioned by means of screws 186 and 188 to plate 120. In this manner, only longitudinal displacement relative to plate 120, is allowed and the index does not rotate with shaft 94. A tensioning spring 190 for assisting in alignment is connected between a stud 192 on member 176 and a stud 194 on plate 120.

*Main spindle drive and slide wire unit*

The main spindle 94 of the tester of the invention (FIG. 4) is supported for rotation within two ball bearings 196 and 198. Attached to the lower end of this spindle by a pin 200 is a spindle drive disc 162. The manner in which this disc is driven will be more fully explained infra in the section entitled "Main Drive Unit."

Figures 13, 14, 15:
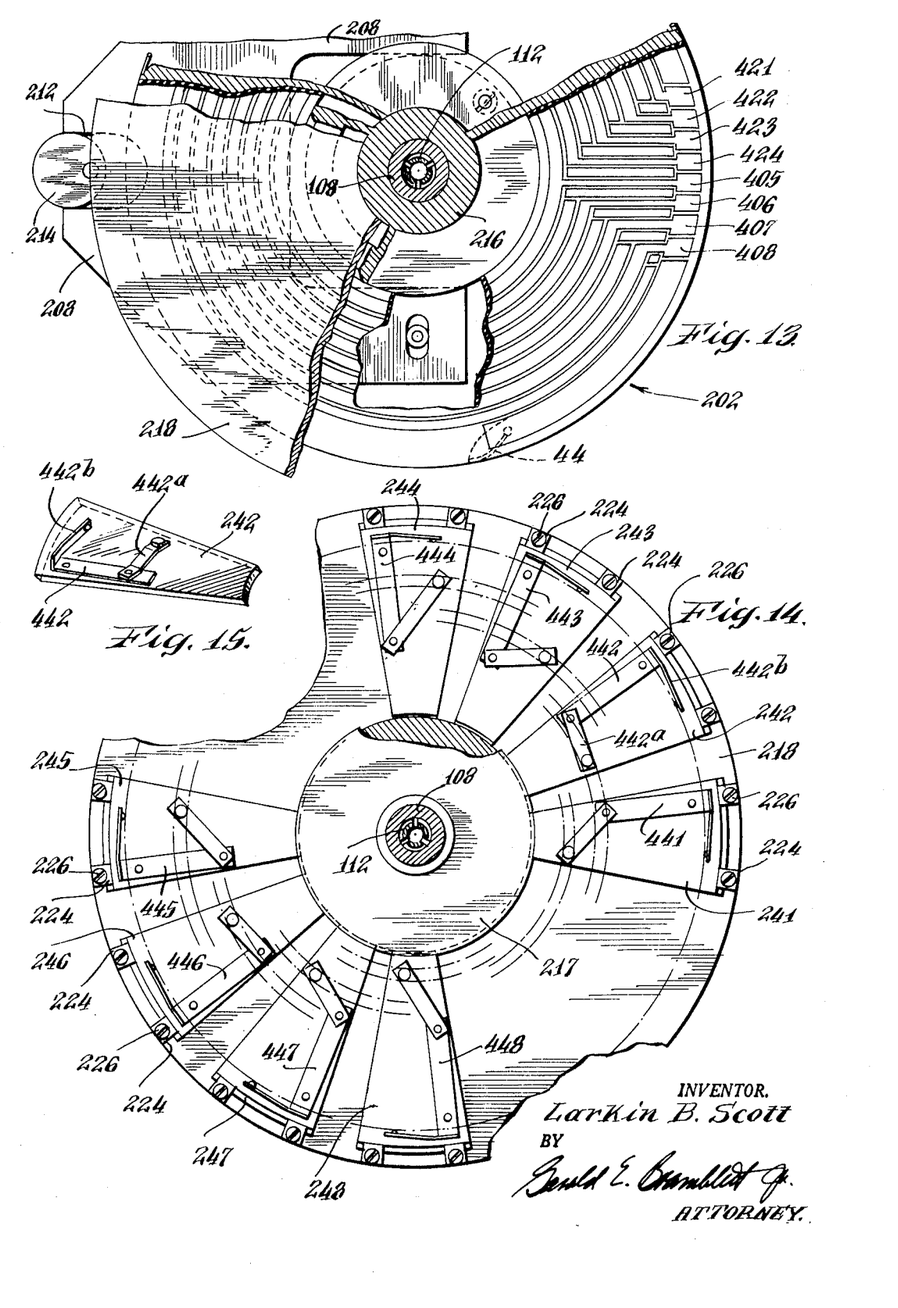
FIG. 13 is a cross-sectional plan view taken along line 13—13 of FIG. 4.
FIG. 14 is a bottom view taken along 14—14 of FIG. 4.
FIG. 15 is a detail of one of the elements shown in FIG. 14.

A slide wire supporting disc 202 is mounted concentric to the upper portion of spindle 94 but essentially non-rotatable. Slide wire 44 is mounted in a groove on the periphery of this disc. The underneath side of disc 202 contains two slots 204 located 180° apart and having their longer axes radial with disc 202. Positioned in each slot is an alignment stud 206 which is secured to an alignment yoke 208. Yoke 208, in turn, lies on a shelf 210 and contains a U-shaped slot 212 (FIG. 13). An eccentric cam 214 serves to rotate yoke 208 and provides for adjustment of disc 202 about its center and relative to spindle 94. The central hole of disc 202 is fashioned in the same manner as that of index plate 166. Retention in the seat of the so-formed V is accomplished by spring restraint.

The top disc 202 contains a printed slip-ring circuit of circular elements 405–408 and 421–424, as shown in FIG. 13 and schematically in FIG. 1.

Fixedly mounted on spindle 94 is a collar 216. This collar has a vertical cylindrical portion secured to and surrounding spindle 94 and a disc-like extension 217 having a sloping rim, as will be noted by referring to FIGS. 4 and 14. This disc-like extension serves to secure and drive two additional elements—commutator disc 218 and angle support 220. Members 217, 218 and 220 are joined by a mounting screw 222.

Fastened to the underside of commutator disc 218 are eight commutating segments 241–248 (FIG. 14). Each of these commutating segments is made of insulating material and has a sloping outer edge retained by two wedge clamps 224, each held in place by a screw 226. Each of the commutating segments holds an electrically conductive bridging element 441–448 which makes sliding contact with both a slip ring element (405–408, 421–424) and a point on the surface of slide wire 44. The construction of each of these elements will be more apparent from the detail of FIG. 15. It will be noted that the bridging element 442 makes contact with the slip ring through arm 442a and with the slide wire through wiper arm 442b. It will be noted that the segments are adjusted so that opposing slide wire wiper contacts are exactly 180° apart.

Angle scale support 220 carries on its periphery a graduated angle scale 158 which is positioned adjacent vernier index 156.

*Main drive unit*

The construction and operation of the main drive of the apparatus of this invention will be more apparent from an inspection of FIGS. 5–9. Motor 228 is positioned on a mounting bracket assembly 230 which, in turn, is pivotally and slidably mounted on a hangar rod 232 which is supported by suitable brackets 234. The shaft of motor 228 carries a pulley 236. A second pulley 238 is mounted on an extension arm of bracket assembly 230 and is connected to pulley 236 by means of a belt 240 of circular cross section. The center of gravity of this structure is such that it pivots about rod 232 and rests against drive disc 162 with sufficient force to drive the disc as a result of the friction between it and belt 240 at their point of contact.

A speed changing mechanism is actuated by means of a knob 242 mounted on front panel 164. Knob 242 is fixed to the end of shaft 244 which extends through and is supported by bearing block 246. The other end of shaft 244 terminates in a speed changing yoke 248 including a pair of actuating pins 250, 252 spaced apart and parallel to shaft 244. Pins 250, 252 intermesh with the teeth of a rack 254 which forms a part of mounting bracket assembly 230.

Figure 5:
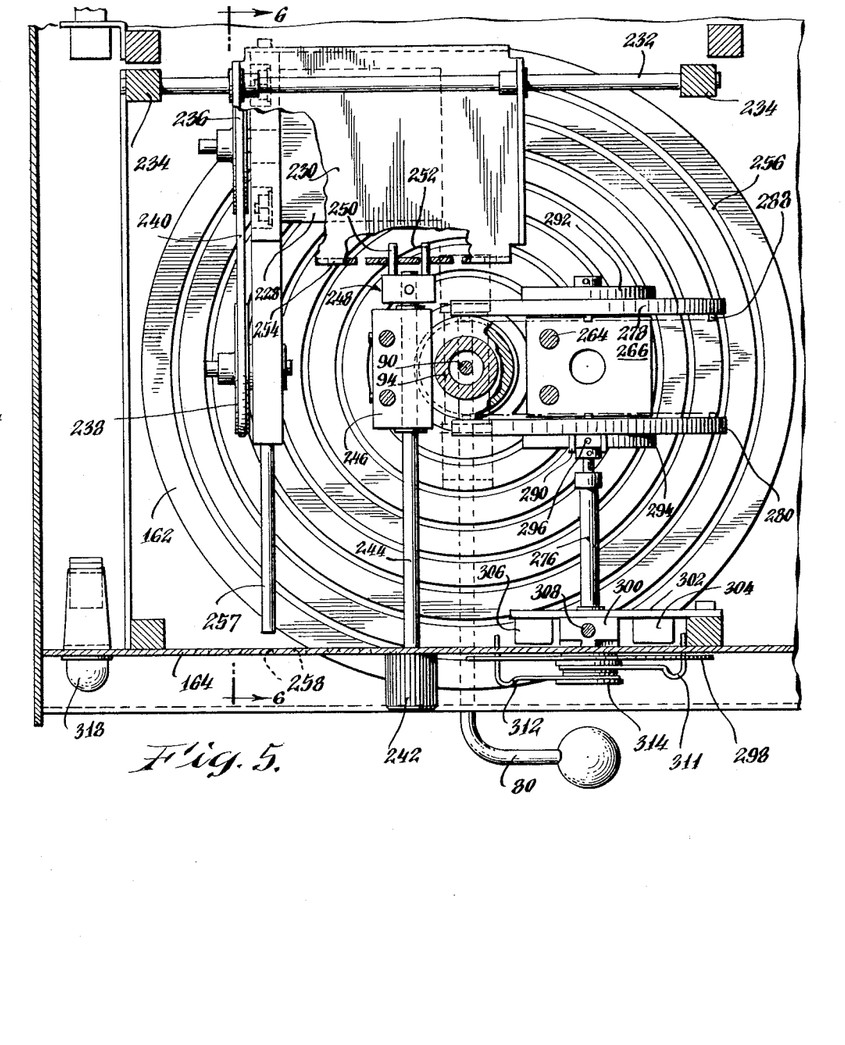
FIG. 5 is a cross-sectional plan view taken along the line 5—5 of FIG. 4.
Figure 6:
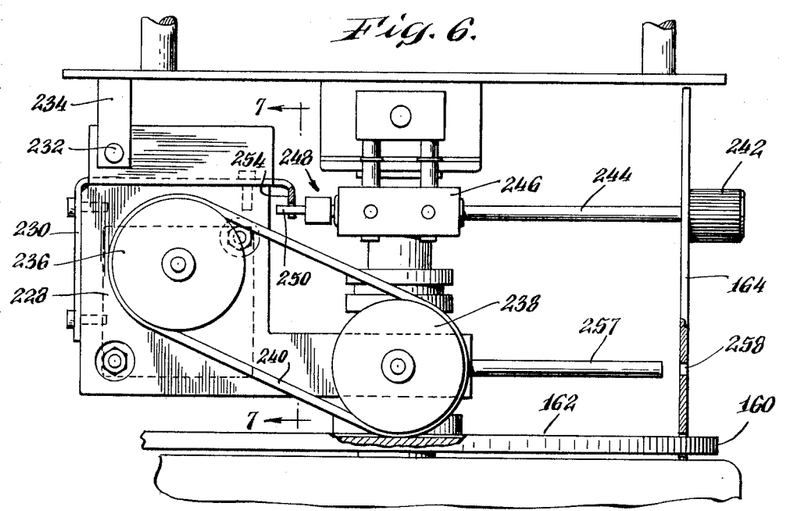
FIG. 6 is an elevational view of the speed drive mechanism of the invention in the driving position looking along 6—6 of FIG. 5.
Figures 7, 8, 9:
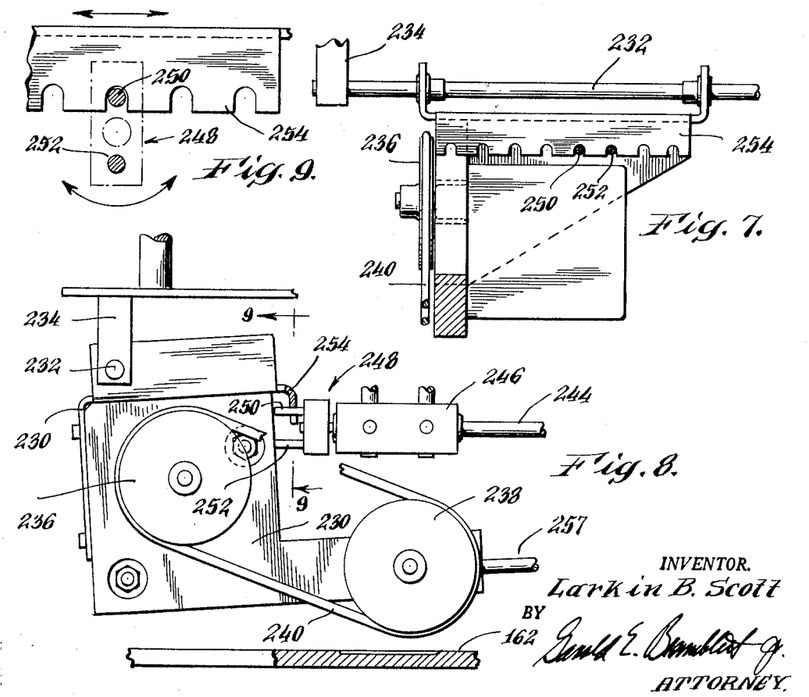
FIG. 7 is a cross-sectional taken along the line 7—7 of FIG. 6.
FIG. 8 is the device of FIG. 6 shown in the lifted position.
FIG. 9 is a detail of the speed change mechanism taken along the line 9—9 of FIG. 8.

It will be apparent that rotation of knob 242 will cause a similar rotation of pins 250, 252. When these pins are initially in horizontal alignment, as shown in FIGS. 5, 6, and 7, belt 240 will rest on the surface of disc 162 at a given point along its radius. When knob 242 is rotated through 90° in either direction, one of pins 250, 252 will lift rack 254 and thereby pivot assembly 230 about rod 232, lifting belt 240 out of contact with disc 162 (FIGS. 8, 9). Further rotation will replace belt 240 on disc 162 at some other radial location. In order to increase the friction for drive purposes, disc 162 is provided with grooves 256 at each position of pulley 238. Grooves 256 then receive belt 240.

A speed indicating rod 257 extends from bracket assembly 230 toward front panel 164. Panel 164 is provided with a series of holes 258. The end of rod 257, which may be suitably color-tipped, is visible through one of these holes whenever belt 240 is in the driving position.

*Transformer tap changer*

Figure 19:
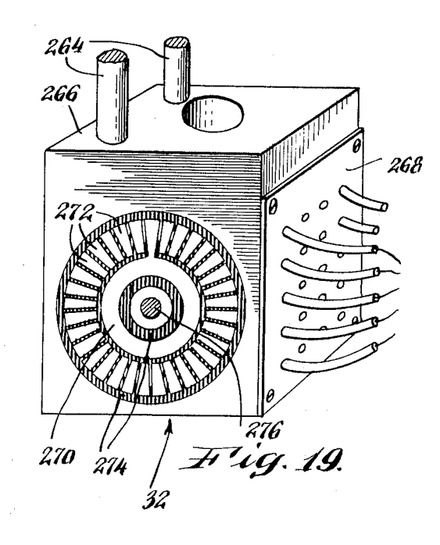
FIG. 19 is a perspective view of the transformer-commutator assembly used in the apparatus.

Mounted on spindle 94 and rotating therewith is a cylindrical cam 260 having a cam slot 262 characterized by a long period of dwell and relatively abrupt motion periods. Suspended alongside spindle 94 by transformer support rods 264 is a transformer block 266, shown in detail in FIG. 19. This block contains transformer 30 and is provided with a suitable terminal board 268 for supplying power to the transformer primary and for connecting windings 40, 42 to slip rings 405-408 and 421–424. On one side of block 266 is a commutator 32 and on the opposite side a commutator 34. Each commutator comprises a slip ring 270 internally connected to the midpoint of either winding 40 or 42 (FIG. 1) and a plurality of radial segments 272, connected to alternate taps of winding 28. The slip ring and commutator segments are insulated from each other and block 266 by a suitable insulating medium 274.

Figure 17:
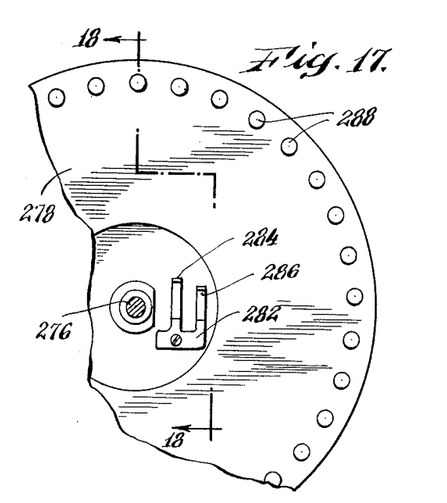
FIG. 17 is an elevation of a switching disc usable in this invention.

A shaft 276 (FIGS. 4, 5, and 19) protrudes from each side of block 266. Rotatably mounted on each end of the shaft is a switching disc 278, 280 made of an insulating material. These discs are similar and one only is shown in detail in FIGS. 17 and 18. Positioned on each disc is an electrical bridging element 282 having springing contact arms 284 and 286. Arm 284 makes contact with slip ring 270 and arm 286 switches between segments 272.

On the periphery of each switching disc 278, 280 are actuating pins 288. The discs are so positioned that one pin of each disc is at all times located in cam slot 262 of cylindrical cam 260. Consequently, each disc is advanced one segment of commutator 32 with every other half revolution of main spindle 94.

*Turns counter and limit stop*

Each of switching discs 278, 280 carries, on the side opposite actuating pins 288, a pair of turns counter drive pins 290. Each pair of pins 290 is separated by an angular relationship equal to ½ that existing between adjacent actuating pins 288 on the same switching disc. This relationship will be more apparent from the semi-schematic illustration of FIG. 20.

Affixed to shaft 276 are two turns counter drive discs 292, 294. Disc 292 is positioned adjacent switching disc 278 while disc 294 is positioned adjacent disc 280. Mounted on the periphery of each of discs 292, 294 is a radial pin 296 which extends between a corresponding pair of counter drive pins 290.

The alignment of the corresponding pins on disc pairs 278, 292 and 280, 294 is such that with each half revolution of cylindrical cam 260, either pin 296 or its counterpart on disc 292 is advanced by the movement of its corresponding drive pin 290. This, in turn, causes shaft 276 to advance a finite distance for each such half revolution of the main spindle 94.

Attached to shaft 276 is a counter dial 298 which is positioned in line with a circular opening in front panel 164. Directly behind this opening and rotatable on a bushing surrounding shaft 276 is a switching block 300. The construction of this block will be more apparent from FIG. 21 which illustrates the block as seen from the front of the instrument with both counter dial 298 and front panel 164 cut away.

Mounted on a bracket 302 is clockwise limit switch 304, and a counter-clockwise limit switch 306. Affixed to the top of block 300 is a manual actuating lever 308 designed as shown in FIG. 4 to protrude in front of panel 164.

Figure 20:
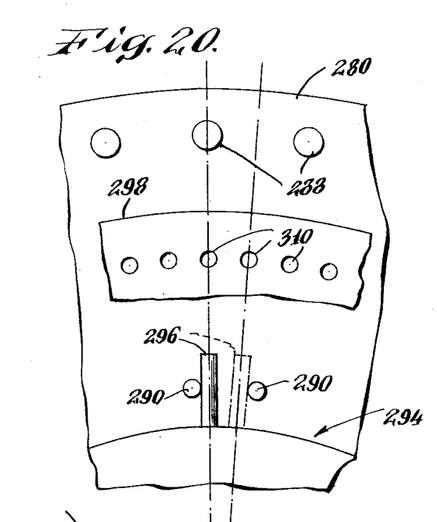
FIG. 20 is a semi-schematic illustration showing a portion of the counter-limit stop mechanism.
Figure 21:
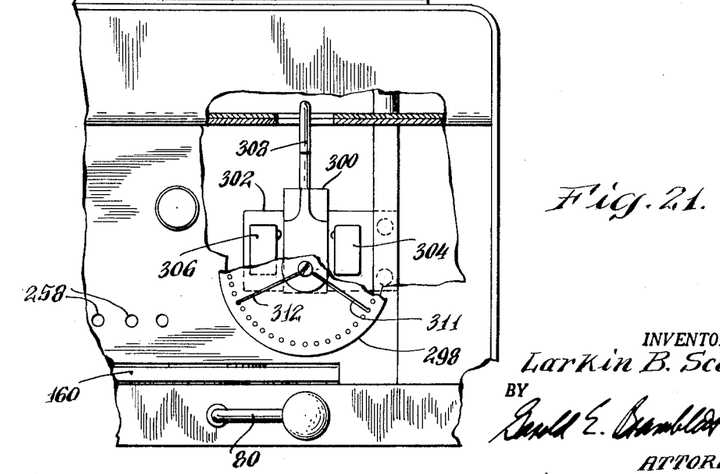
FIG. 21 is a partial front elevation with the front cover partially cut away to show the placement of the limit switches.

Dial 298 is calibrated in terms of revolutions and half revolutions of main spindle 94. At each such position, a hole 310 is drilled through the dial 298 as shown in FIGS. 3, 20, and 21. A pair of radial springs 311, 312 are rotatably secured to a central hub 314. The ends of springs 311 and 312 are designed to fit into holes 310 and extend inwardly to a point where they are aligned with block 300.

As dial 298 rotates in synchronism with main spindle 94 in either the clockwise or counter-clockwise direction, one of springs 311, 312 will eventually contact block 300 and force it against a corresponding limit switch 302, 306, reversing or stopping the main drive motor 228.

General description

The appearance of a tester constructed in accordance with the invention is shown in FIG. 3. Its approximate dimensions are 13" wide, 9" high and 11" deep. Its principal purpose is to provide linearity records of various A.C. potentiometers. This description refers specifically to the testing of Series 2, 4, and 3 Vernistat A.C. potentiometers manufactured by the Perkin-Elmer Corporation of Norwalk, Connecticut. Changes in the instrument to accommodate one or the other or these models are made quickly and conveniently by manipulating components located on the front panel. These adjustments provide the correct voltage, range of travel and duration of test run for each model. All tests are performed by 400 cycle excitation.

| Model | Electrical travel, degrees | Test voltage, volts | Duration of test, one direction only |
|---|---|---|---|
| 2 | 3,494 | 10 | 1.6 minutes minimum. 5 minutes maximum. |
| 4 | 3,600 | 10 | 1.6 minutes minimum. 5 minutes maximum. |
| 3 | 10,800 | 30 | 5 minutes minimum. 15 minutes maximum. |

The tester of the invention produces a D.C. voltage which varies in proportion to the linearity error of the model under test. A standard 0–10 millivolt strip chart recorder is used as separate equipment to record the linearity record. Plus or minus 0.5" deflection on the chart represents a plus or minus .05% error for the models 2 and 4, whereas for the model 3, a 0.3" deflection represents a .01% error. Because the electrical travel of the tester matches the design figure for each model tested, the linearity record also displays the behavior of the unit under test with respect to terminal linearity.

The tester may be readily altered to accommodate units not having the same electrical travel as the models listed above. This change affects a reference transformer and switching assembly and the separate 400 cycle electronics chassis which is shown exposed in FIG. 22. These are designed as individual packages which may be removed or installed with the aid of simple tools. A portion of the front panel 326 is an integral part of the 400 cycle chassis so that a change of model number designations on the model selector switch 320 is also accomplished. Other circuit components not contained in the modulator 400 cycle chassis, include the 60 cycle drive motor 228 and control circuit, and these parts are readily accessible without major disassembly.

The motor drive for the spindle 94 of the tester is provided with several modes of operation. In the MANUAL position of control knob 316 (FIG. 3) the motor 228 is normally off. It can be driven electrically in either direction by moving lever 308 which protrudes downward just over the turns counter index. In the CCW STOP position, the motor will drive main spindle 94 and the shaft of the tested unit counter-clockwise (looking into the shaft end) until the counter-clockwise stop is reached. Similarly, in the CW STOP position it will drive clockwise until the clockwise stop is reached. (CW and CCW refer to the unit 60 under test in the conventional sense.) These conditions hold whether motor 228 is started off in one direction or the other. For instance, it is possible to begin a run at the counter-clockwise stop and have the run continue to the clockwise stop, reverse, and then return to the counter-clockwise stop and remain. An indicator light 318 (RUN IN PROGRESS) extinguishes when such an excursion has been completed. In the CONT. position of knob 316, the motor will drive continuously between stops.

The clockwise and counter-clockwise limit stops are completely adjustable to the nearest half revolution. The stops consist of limit switches 304, 306, block 300, and the radial spring wires 311, 312 which snap into any one of sixty-six holes 310 on the face of the turns counter dial 298. These wires are easily moved from one position to another with the thumb and index finger. This is an adjustment that must be made in changing from one model to another.

There are seven different speeds available for the main spindle drive. The speed is changed from one value to the next by turning the SPEED CHANGE dial 242 180° (CW to increase speed). The light colored speed indicating rod 257 may be observed through one of seven holes 258 in the front panel to identify the particular speed setting. In changing from one speed to another, the motor drive is temporarily disengaged from the drive disc 162. Thus, moving the speed change knob 242 by 90° eases manual adjustment of spindle position by means of knurled edge 160 of drive disc 162.

The upper knob 320 at the right of the panel controls the main 400 cycle function switch. In the SET position the chopper circuit 24 is operating and the angle scale 158 is illuminated, but power is off to the test leads which extend from the rear of the instrument and connect to the unit under test. The remaining positions of this control select voltage and tap conditions for the various models accommodated.

The PEN POS. dial 322 controls the D.C. bias in the output circuit to the recorder 26 and enables the operator to adjust the recorder pen to the center of the chart or any other desired position.

The lever action switch 324 at the bottom of panel 326 possesses three positions. Center is the normal or RUN position and compares the output of the unit under test with that of the tester. In the CT position the center tap of the unit under test is connected for zero setting in center tap based conditions. In the ZERO position the input to the recorder 26 is shorted in order to identify the zero error signal position and also to test the synchronous rectifier circuit of the tester for noisy operation or battery drift.

Center tap based operation is featured in the present tester design although this is not the only scheme that is possible. Hence the turns counter dial 298 is graduated in both directions from center tap, and in switching from model to model, the same center tap is preserved in the tester. A marker circuit (not described) is provided which inserts a narrow spike of voltage in the recorder circuit as the center tap is passed over. This marks the linearity record at the center tap position.

The tester of the invention includes all component (synchronous rectifier, battery, etc.) necessary for tester operation except the recorder 26. An output of 60 cycle power for the recorder chart drive motor is interrupted at the completion of a run in order to conserve chart paper.

The alignment procedure

In the foregoing explanation of the tester operating principle, it was stated that in the condition of correct adjustment, the voltage difference between any two points on slide wire 44 separated by 180° would just equal the voltage difference between adjacent taps of the voltage divider transformer 30. Furthermore, it was stated that the slide wire wiper pairs (such as wipers 443 and 447) are separated by 180° and that adjacent pairs are angularly separated by an amount corresponding to the voltage separation of taps on the secondaries of transformer 30. The tester is provided with adjustments that enable all these conditions to be met, and the procedure for securing these conditions is a part of the final assembly operation for every tester. It is also wise to check these conditions from time to time during normal use of the tester.

Figure 22:
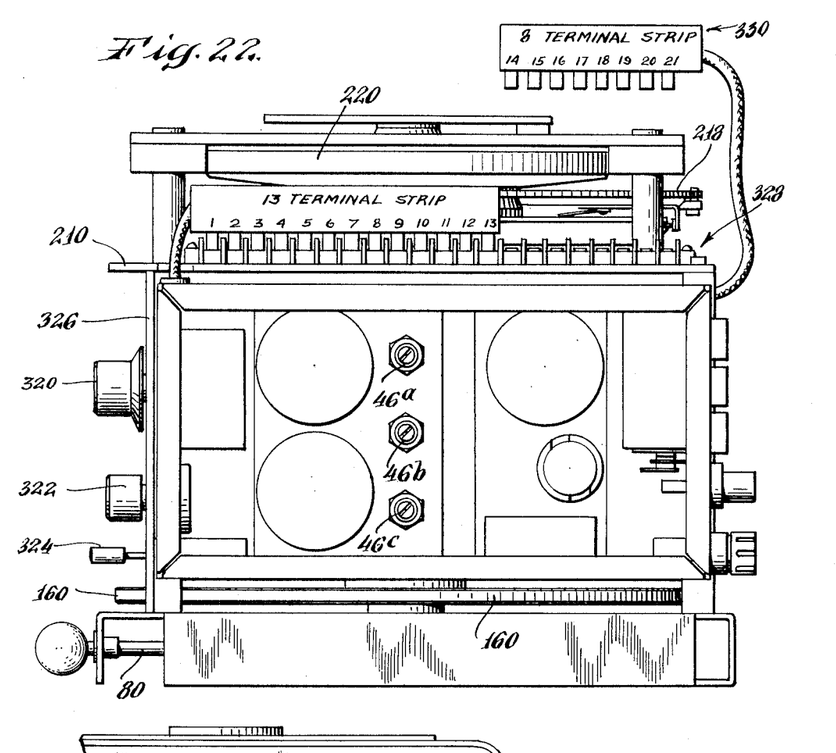
FIG. 22 is a side elevation of the apparatus showing the electrical terminals and trimmer resistors.

By the novel features of this invention, it is possible to carry out these alignment adjustments without having to make any precise angular measurements. The principal tool required is an oscilloscope having sufficient sensitivity for observing electrical nulls on the order of a hundred microvolts or so. The procedure involves opening the leads to all slide wire wipers 441–448 and observing the voltage between a wiper and its transformer tap. FIG. 22 shows the principal components of the tester that are involved. There is a twenty-one point terminal strip 328 which is exposed at the right hand, top side of the tester when the main cover is removed. The connections to the eight slide wire wipers are made at this terminal strip at positions 14 thru 21. The eight leads are held together by an eight terminal fanning strip 330, and this is removed as illustrated. The scope connection would be made between the corresponding terminals thus exposed. Each wiper assembly is held by screws 226 and clamps 224 (FIG. 14, and its angular position may be adjusted when these are loosened. The trimmer resistors 46a, 46b, 46c are also exposed on the right hand side of the instrument. A different trimmer 46 is required for testing each of the various potentiometer models.

To begin the procedure, the circuit is closed to slide wire wiper 443 using clip lead or other suitable connection between its terminal on the fanning strip 330 and on the terminal strip 328. With the power cord of the 400 cycle chassis plugged into a suitable source (400 cycle, 117 volts), the 400 cycle function switch 320 is turned to position 2. The vertical scope leads are connected in series with the wiper circuit at the fanning strip 330 and terminal strip 328. An isolation transformer may be required for the scope input to avoid grounding conflicts. The average level of the slide wire voltage with respect to 400 cycle ground will be minimum for a spindle setting near 5 turns counter-clockwise. A 400 cycle reference signal should be applied to the horizontal deflection input of the scope so as to provide a Lissajous pattern display making polarity of the A.C. signal observable.

Spindle 94 is rotated manually until wipers 443 and 447 are both contacting the slide wire 44. Assuming that an improper set of conditions occur to begin with, there should now appear a signal on the scope due to incorrect orientation of wipers or wrong voltage gradient on slide wire 44. The angular position of either of the wipers is adjusted until they appear to be separated by 180° as judged by eye. With both wipers 443, 447 contacting the slide wire 44, trimmer 46a is adjusted for the best possible null on the scope.

Figures 18, 24:
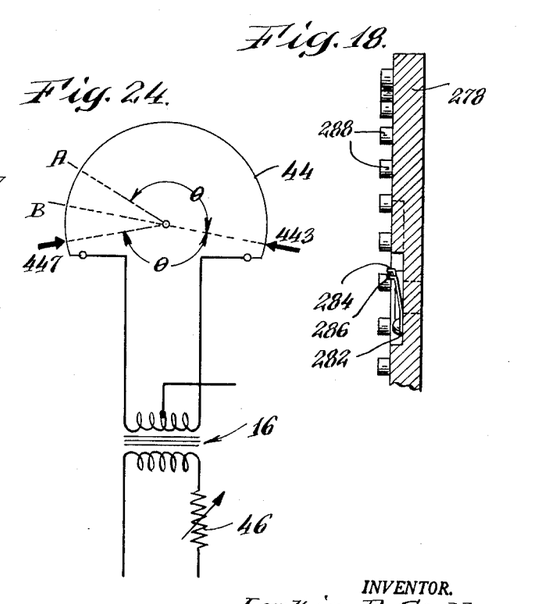
FIG. 18 is a cross-sectional elevation taken along line 18—18 of FIG. 17.
FIGS. 23 and 24 are electrical schematics used in explaining the alignment procedure.
Figure 23:
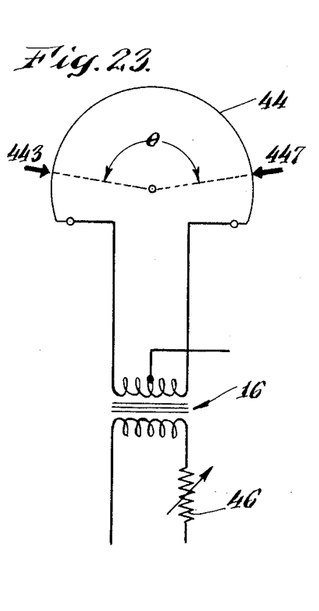

Having achieved the best possible null in the step above, spindle 94 is rotated approximately 180° so that wipers 443 and 447 are again both in contact with the slide wire 44. Unless they were originally positioned exactly 180° apart, the scope will no longer exhibit a null. The situation is illustrated in FIGS. 23 and 24. In FIG. 23 it is assumed that the wipers 443 and 447 are separated by the angle $\theta$ which is less than 180° as measured in the sector wholly occupied by the slide wire 44. When the trimmer 46 is adjusted under these circumstances so as to give a null on the scope, the voltage gradient along the slide wire 44 must be made greater than the normal value in order that the wiper to wiper voltage drop is achieved in a smaller than normal length of slide wire. In the position illustrated in FIG. 24, the wipers have been rotated approximately 180°, and the distance between the wipers, measured along the slide wire, is too great. Referring to FIG. 24, it is obvious that wiper 447 could be removed to position A and the null would be restored, since this would establish the original separation of the two wipers as measured along the slide wire. But this, of course, would not improve matters. The correct adjustment for wiper 447 would be to move it to position B which is half way to position A. Thus, the procedure at this point is to observe the magnitude of the scope voltage for the second position, and then adjust the position of wiper 447 until this voltage is reduced to one half its original value. Having done this, trimmer 46 is again adjusted for the best possible null. The result achieved by the steps just described is that the wiper separation has more nearly approached 180° and the voltage gradient along slide wire 44 has been brought closer to the correct value.

The spindle 94 is now rotated 180° going back to the first position. A good null may still not exist, and so wiper 447 is again adjusted to cut the null voltage by one half and trimmer 46 adjusted again for a new null. The procedure is continued until no further improvement is possible. At this point a good null should exist for both positions of the spindle 94. If so, then the correct trimmer setting for the model under test has been achieved, and the wipers 443 and 447 have been properly positioned.

The next step is to complete the wiper 447 circuit with a clip lead. Both wipers 443 and 447 are now connected. Positioning the spindle 94 as shown in FIG. 23, wipers 444, 445, and 446 are in the sector occupied by the slide wire 44. The scope input leads are connected in series with each of these in turn, and the position of each is adjusted to obtain the best possible null. Spindle 94 is then rotated 180° and the procedure is repeated for wipers 441, 442, and 48. At this point, all wipers have been positioned presumably in the proper relationship with each other. This may not be true, however, if there is a marked non-linearity of the slide wire 44. To check this, the scope is placed in series with wiper 445. Connect only wipers 443 and 447 by clip leads. Observe the null that occurs while wiper 445 is rotated throughout the length of the slide wire 44. The null should not exceed plus or minus 0.3 millivolt. If this value is exceeded, either the linearity of the slide wire 44 is at fault, or the center about which the wipers rotate is not concentric with the slide wire. The latter possibility should be checked mechanically by mounting a dial indicator on the disc 218 which carries the wipers, letting the feeler ride on the surface of the slide wire 44. On rotating the spindle 94, the indicator should not vary more than plus or minus .005" throughout the length of the slide wire 44. If this condition is met, then it must be assumed that the linearity of the wire is at fault, and a new strip of freshly drawn wire should be substituted.

*Accuracy*

A tester manufactured in accordance with this invention was checked for accuracy by the following procedure:

(1) The accuracy was checked against a standardizing decade ratio transformer having an accuracy of .001%. There was no observable error.

(2) A highly accurate Vernistat A.C. potentiometer which had been previously manufactured and retained for standardizing purposes was clamped in the tester and a linearity curve was obtained.

(3) A series of such curves was then run, but the potentiometer was angularly displaced with respect to the tester by a finite amount for each curve.

(4) The resulting curves were then superimposed upon one another. Any error in the tester, as opposed to error in the potentiometer, should then show up as irregularities between curves.

The minimum detectable error that could have been observed in this manner was .001%. As a matter of fact, no such error was detected. The basic accuracy of the apparatus of the invention, therefore, is greater than .001%, or 1 part in 100,000.

It will be apparent to those skilled in the art that the invention described in the foregoing description and the attached drawings marks a significant advance in the field of electrical testing and transducers.

It is to be understood that this description is illustrative only and is not to be construed as limiting the invention. The invention is limited only by the scope of the following claims.

I claim:

1. Apparatus for producing a variable electrical output voltage which comprises slide wire means; a plurality of slide wire wiper means forming a first group of wiper means and a second group of wiper means, said wiper means being linearly displaced along said slide wire means; first voltage supply means connected to apply a first potential to said first group of wiper means; second voltage supply means connected to apply a second potential to said second group of wiper means; third voltage supply means connected to apply a potential difference across said slide wire means; fourth voltage supply means connected to apply a potential difference between adjacent wiper means in each of said groups substantially equal to the voltage drop in that portion of said slide wire means between said adjacent wiper means; output means connected to provide said output voltage existing between ground and a preselected point on said slide wire means; and means for providing relative movement between said wiper means and slide wire means.

2. The apparatus of claim 1 wherein each wiper means in one group has a corresponding wiper means in the other group to form a plurality of pairs, both wiper means of each pair being in contact with said slide wire means over a preselected range.

3. Apparatus for producing an electrical output voltage bearing a highly linear relationship to shaft rotation which comprises slide wire means; a plurality of slide wire wiper means forming a first group of wiper means and a second group of wiper means, each wiper means in one group having a corresponding wiper means in the other group to form a plurality of pairs, both wiper means of each pair being in contact with said slide wire means over a preselected range of shaft rotation; rotatable shaft means operatively connected to provide relative movement between said slide wire means and said slide wire wiper means; first voltage supply means connected to supply a first potential difference between said first and second groups; second voltage supply means connected to supply a second potential difference between each set of adjacent wiper means within a group substantially equal to the voltage drop across the segment of said slide wire means between said adjacent wiper means; third voltage supply means connected to supply a third potential difference across said slide wire means; and electrical output means connected to present said electrical output voltage proportional to the potential existing between a point on said slide wire and a reference point.

4. The apparatus of claim 3 wherein said slide wire means occupies an arc of a circle.

5. Apparatus for testing the output linearity of a transducer having a variable voltage output which comprises slide wire means; a plurality of slide wire wiper means forming a first group of wiper means and a second group of wiper means, said wiper means being linearly displaced along said slide wire means; first voltage supply means connected to apply a first potential to said first group of wiper means; second voltage supply means connected to apply a second potential to said second group of wiper means; third voltage supply means connected to apply a potential difference across said slide wire means; fourth voltage supply means connected to apply a potential difference between adjacent wiper means in each of said groups substantially equal to the voltage drop in that portion of said slide wire means between said adjacent wiper means; control means connected to provide relative movement between said wiper means and said slide wire means; linking means connected to synchronize said control means with the variable voltage output of said transducer; output means connected to provide a signal proportional to the voltage existing between ground and a preselected point on said slide wire means; and electrical circuit means connected to compare said signal with the voltage output of said transducer.

6. The apparatus of claim 5 wherein each wiper means in one group has a corresponding wiper means in the other group to form a plurality of pairs, both wiper means of at least one pair being in contact with said slide wire means at all times.

7. The apparatus of claim 6 wherein said control means comprises rotatable shaft means.

8. The apparatus of claim 7 wherein said slide wire means occupies an arc of a circle.

9. Apparatus for producing an electrical output voltage variable with shaft rotation which comprises rotatable shaft means; arcuate slide wire means concentric with said shaft means and encompassing an arc greater than 180° but less than 360°; a plurality of arcuate slip ring means concentric with said rotatable shaft means; a first group of slide wire wiper means spaced along an arc of said slide wire means; a second group of slide wire wiper means spaced along an arc of said slide wire means each wiper means in said second group having a corresponding wiper means in said first group to form a plurality of pairs, both wiper means of at least one pair being in contact with slide wire means at all times; bridging means electrically interconnecting each of said slide wire wiper means with a different one of said slip ring means; driving means mechanically coupling said slide wire wiper means with said shaft means for rotation therewith; first voltage supply means connected to those slip rings associated with said first group of wiper means to provide voltages between adjacent wiper means substantially equal to the voltage drop of said slide wire means therebetween; second voltage supply means connected to those slip rings associated with said second group of wiper means to provide voltages between adjacent wiper means substantially equal to the voltage drop of said slide wire means therebetween; third voltage supply means including a plurality of taps, one of said taps being at a reference potential; a first commutator of first commutator segments, each of said first segments being connected to one of said taps; a second commutator of second commutator segments, each of said second segments being connected to a tap intermediate taps connected to said first segments; first commutator wiper means operable for movement along said first commutator segments; first electrical connecting means between said first commutator wiper means and said first voltage supply means; second commutator wiper means operable for movement along said second commutator segments; second electrical connecting means between said second commutator wiper means and said second voltage supply means; means for alternately advancing said first and second commutator wiper means along their respective commutators; fourth voltage supply means connected to apply a fourth voltage to said slide wire means; and voltage output connection means effectively connected to a point on said slide wire means.

10. The apparatus of claim 9 wherein the segments of said first commutator are retained in a first plane parallel to the axis of rotation of said shaft means; said first commutator wiper means is supported by rotatable first disc means lying in a second plane parallel to said axis of rotation; the segments of said second commutator are retained in a second plane parallel to the axis of rotation of said shaft means; said second commutator wiper means is supported by rotatable second disc means lying in a third plane parallel to said axis of rotation; and wherein said means for advancing said first and second commutator wiper means comprises cylindrical cam means on said rotatable shaft means and cam rider means on each of said first and second disc means.

11. The apparatus of claim 10 wherein said cam means is characterized by a relatively long dwell period as compared to the motion period.

12. Apparatus for testing the output linearity of a transducer having a voltage output variable with mechanical input which comprises rotatable shaft means; arcuate slide wire means concentric with said shaft means; a plurality of arcuate slip ring means concentric with said rotatable shaft means; a first group of slide wire wipers means spaced alonog an arc of said slide wire means; a second group of slide wire wiper means spaced along an arc of said slide wire means, each wiper means in said second group having a corresponding wiper means in said first group to form a plurality of pairs, both wiper means of at least one pair being in contact with said slide wire means at all times; bridging means electrically connecting each of said slide wire wiper means with a different one of said slip ring means; driving means mechanically coupling said slide wire wiper means with said shaft means for rotation therewith; linking means connected to vary the mehanical input to said transducer in synchronism with the rotation of said shaft means; first voltage supply means connected to those slip rings associate with said first group of wiper means to provide voltages between adjacent wiper means substantially equal to the voltage drop of said slide wire means therebetween; second voltage supply means connected to those slip rings associated with said second group of wiper means to provide voltages between adjacent wiper means substantially equal to the voltage drop of said slide wire means therebetween; third voltage supply means including a plurality of taps, one of said taps being at a reference potential; a first commutator of first commutator segments, each of said first segments being connected to one of said taps; a second commutator of second commutator segments, each of said second segments being connected to a tap intermediate taps connected to said first segments; first commutator wiper means operable for movement along said first commutator segments; first electrical connecting means between said first commutator wiper means and said first voltage supply means; second commutator wiper means operable for movement along said second commutator segments; second electrical connecting means between said second commutator wiper means and said second voltage supply means; means for alternately advancing said first and second commutator wiper means along their respective commutators; fourth voltage supply means connected to apply a fourth voltage to said slide wire means; voltage output means effectively connected to a point on said slide wire means; and signal producing means responsive to the voltage difference between the voltages of said voltage output means and said transducer.

13. The apparatus of claim 12 wherein said linking means comprises shaft clamping means adapted to clamp the transducer mechanical input to said rotatable shaft.

14. The apparatus of claim 12 wherein said transducer mechanical input is a shaft and wherein said linking means comprises shaft clamping means adapted to clamp the transducer shaft to said rotatable shaft and transducer alignment means adapted to maintain said transducer shaft and said rotatable shaft in alignment.

15. The apparatus of claim 14 wherein said alignment means comprises a mounting plate adapted to retain said transducer, said mounting plate being supported by at least two pairs of resilient arm members, the arm members of each pair being substantially parallel, the arms of each pair having a component of resilient motion essentially perpendicular to a component of resilient motion of the other pair.

References Cited by the Examiner
UNITED STATES PATENTS

| | | | |
|---|---|---|---|
| 1,710,518 | 4/29 | Simsratt | 248—359.1 |
| 2,312,718 | 3/43 | Kouyoumjian | 248—358.1 X |
| 2,830,807 | 4/58 | Johnson | 248—358.1 X |

WALTER L. CARLSON, *Primary Examiner.*